United States Patent [19]

Hou et al.

[11] 4,288,462

[45] Sep. 8, 1981

[54] METHOD FOR REMOVING CATIONIC CONTAMINANTS FROM BEVERAGES

[75] Inventors: Kenneth C. Hou, Glastonbury; Eugene A. Ostreicher, Farmington, both of Conn.

[73] Assignee: AMF Incorporated, White Plains, N.Y.

[21] Appl. No.: 118,142

[22] Filed: Feb. 4, 1980

[51] Int. Cl.³ .............................................. C12H 1/00
[52] U.S. Cl. .................................. 426/423; 210/777; 426/330.3; 426/330.4
[58] Field of Search ............... 426/422, 423, 495, 271, 426/330.3, 330.4, 330.5; 210/505, 504, 23 R, 777; 106/286.1; 162/152; 252/317

[56] References Cited

U.S. PATENT DOCUMENTS

| 3,007,878 | 11/1961 | Alexander et al. | 106/286.1 |
| 3,252,917 | 5/1966 | Mindick et al. | 252/317 |
| 3,253,978 | 5/1966 | Bodendorf et al. | 162/152 |
| 4,007,113 | 2/1977 | Ostreicher | 210/504 |
| 4,007,114 | 2/1977 | Ostreicher | 210/504 |

*Primary Examiner*—Joseph M. Golian
*Assistant Examiner*—George C. Yeung
*Attorney, Agent, or Firm*—George W. Price; Michael E. Zall

[57] ABSTRACT

Process for production of anionically charged filter media sheet including pretreatment of filter elements with cationic charge modifier, preferably employing inorganic colloidal silica charge modifiers. The resulting filters are used for the removal of haze or haze formers from beverages.

8 Claims, 2 Drawing Figures

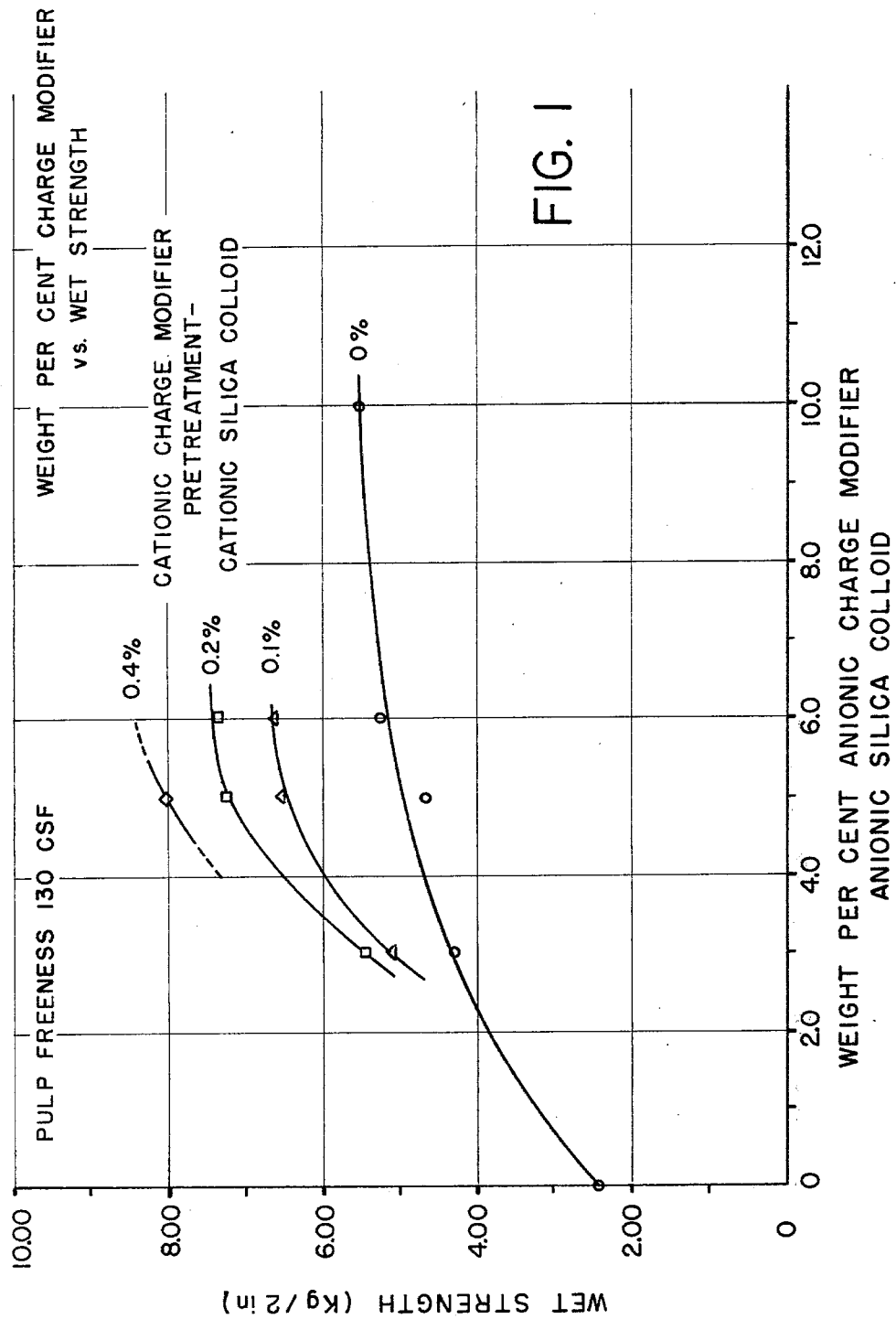

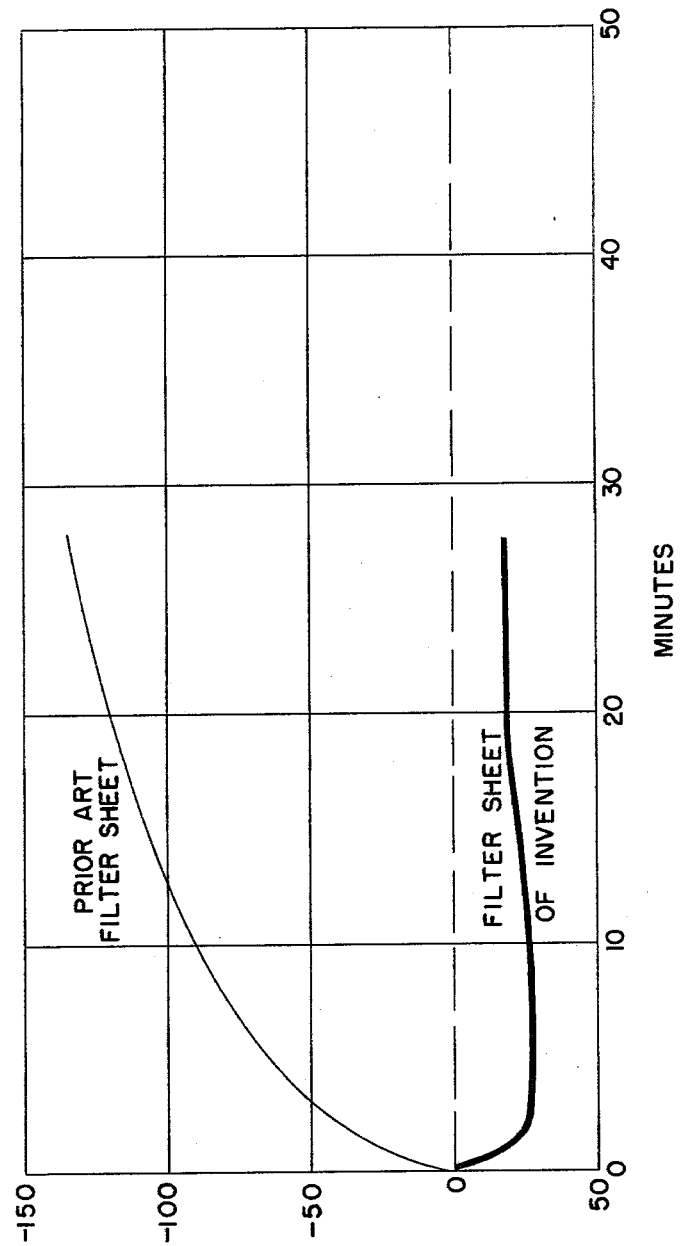

METHOD FOR REMOVING CATIONIC CONTAMINANTS FROM BEVERAGES

BACKGROUND OF THE INVENTION

This invention relates to methods for the preparation of filter media and more particularly, to the provision of anionically charged media of enhanced wet strength from anionic filter elements.

The filtration of fine particle size contaminants from fluids has been accomplished by the use of various porous filter media through which the contaminated fluid is passed. To function as a filter, the media must allow the fluid, commonly water, through, while holding back the particulate contaminant. This holding back of the contaminant is accomplished by virtue of the operation, within the porous media, of one or both of two distinctly different filtration mechanisms, namely (1) mechanical straining and (2) electrokinetic particle capture. In mechanical straining, a particle is removed by physical entrapment when it attempts to pass through a pore smaller than itself. In the case of the electrokinetic capture mechanisms, the particle collides with a surface face within the porous filter media and is retained on the surface by short range attractive forces.

With the exception of microporous polymeric membranes, the porous filter media known to the art as being suitable for the filtration of fine particle size contaminants are comprised of fiber-fiber or fiber-particulate mixtures formed dynamically into sheet by vacuum felting from an aqueous slurry and then subsequently drying the finished sheet. In those fibrous filter media that depend upon mechanical straining to hold back particulate contaminants, it is necessary that the pore size of the filter medium be smaller than the particle size of the contaminant to be removed from the fluid. For removal of fine, submicronic contaminant particles by mechanical straining, the filter media need have correspondingly fine pores. Since the pore size of such a sheet is determined predominantly by the size and morphology of the materials used to form the sheet, it is necessary that one or more of the component materials be of a very small size, such as small diameter fibers. See for example, any of Pall U.S. Pat. Nos. 3,158,532; 3,238,056; 3,246,767; 3,353,682 or 3,573,158.

As the size of the contaminants sought to be removed by filtration decreases, especially into the submicron range, the difficulty and expense of providing suitably dimensioned fiber structures for optimum filtration by mechanical straining increases. Accordingly, there is considerable interest in the use of fine particulates such as diatomaceous earth.

However, for such materials it is necessary to provide a matrix in order to present a coherent handleable structure for commerce and industry. Thus, at least one of the component materials in the sheet is a long, self-bonding structural fiber, to give the sheet sufficient structural integrity in both the wet "as formed" and in the final dried condition, to allow handling during processing and suitability for the intended end use. Unrefined cellulose fibers such as wood pulp, cotton, cellulose acetate or rayon are commonly used. These fibers are typically relatively large, with commercially available diameters in the range of six to sixty micrometers. Wood pulp, most often used because of its low relative cost, has fiber diameters ranging from fifteen to twenty-five micrometers, and fiber lengths of about 0.85 to about 6.5 mm.

In addition to controlling the dispersion characteristics (and therefore the porosity of the sheet) and providing wet strength, charge modifiers are employed to control the zeta potential of the sheet constituents and maximize performance in the electrokinetic capture of small charge contaminants. In practice, cationic charge modifiers are employed since most naturally occurring contaminant surfaces are anionic at fluid pH of practical interest. Thus, a melamine-formaldehyde cationic colloid is disclosed for filter sheets in U.S. Pat. Nos. 4,007,113 and 4,007,114.

Biological fluids present a specialized problem in that certain natural substances, commonly of proteinaceous character, are typically present in the system and are preferably, and even preferentially, removed in the course of a filtration operation. Unlike the submicronic impurities more typically encountered in other systems, these materials are cationic in nature at applicable pH values, i.e., below the isoelectric point for such contaminant.

The surfaces of such filter elements as diatomaceous earth, cellulose fiber and the like may also be characterized as weakly anionic in nature, hence it might be expected that these materials would naturally provide the desired electrokinetic properties for enhanced capture potential of the cationic impurities. However, even to take advantage of this somewhat limited effect it is necessary to provide a coherent integral filter medium of controlled, uniform porosity comprised of interengaged filter elements, ordinarily requiring a binding agent for adequate wet strength. Also, higher levels of anionic charge are desired for optimization of the electrokinetic capture mechanism. The use of filter media comprising binders or charge modifiers in filter systems with biological fluids poses special problems, among them the possibility of introducing to the fluid impurities resulting from loss of or a breakdown in filter elements. While certain levels of particular impurities may be tolerable in some systems, organic extractables pose especially sensitive problems in the filtration of foods and pharmaceutical products. In filter systems composed of cellulose fiber as a matrix for particulate filter aids modified with an organic charge modifying resin, organic extractables are naturally primarily traceable to the resin. Selection of the charge modifying resin can alleviate the problem, even under relatively stringent conditions of use including sanitization and sterilizable procedures. Even in the absence of meaningful levels of extractables, however, many resins of choice are subject to discoloration in use, tending to limit their marketability for food and drugs.

Further, even low levels of certain organic extractables are unacceptable in some systems, and accordingly it is desirable for this reason and that of aesthetics to wholly remove the organic charge modifier resin from the filter construction. At the same time, it is desirable for the removal of submicron charged contaminants to retain the charge potential afforded by a charge modifying resin.

The surfaces of the filter elements may be treated with an inorganic charge modifier such as anionic colloidal silica, but by reason of the repulsive effect of these commonly charged materials, only a modest amount of charge modification is effected, and a coherent structure of adequate wet strength may not be conveniently prepared, even at high levels of charge modifier.

U.S. Pat. No. 3,253,978 to C. H. Dexter & Sons Inc. describes a method of preparing a porous, inorganic sheet product of high strength, free of organic binders, composed of inorganic fibers or flakes, e.g., glass or mineral wool bound with colloidal silica in which a cationic agent, e.g., cationic starch, is added to the aqueous slurry containing the anionic colloidal silica binder shortly before deposit upon an inclined Fourdrinier wire. No cellulose containing systems are employed. The patentee compares performance to the similar use of dicyandiamide formaldehyde condensates with cellulose or asbestos in U.S. Pat. No. 3,022,213, evidencing the slow drainage rates experienced. It is probable that the slow drainage rates are a result of the mutual coagulation of the anionic colloidal silica and the cationic starch.

It is accordingly an object of the present invention to provide charge modified filter media sheets of enhanced filtration performance, especially for the removal of submicron contaminants from aqueous systems at high efficiency.

Another object is to provide charge modified filter media characterized by low organic extractables over a wide range of filtration conditions.

A still further object is the provision of filter media effective across the spectrum of biological liquids and, particularly, ingestables such as food and drugs.

A specific object is the provision of anionically charged media of enhanced wet strength from anionic filter elements.

These and other objects are achieved in the practice of the present invention as described hereinafter.

GENERAL DESCRIPTION OF THE INVENTION

The method of the invention involves the utilization of an inorganic cationic charge modifier in the treatment of cellulose pulp and particulate filter aid, to reduce or reverse the surface charge of the anionic filter elements, whereby anionic charge modification may be effected to a desired level, in one or more stages. For example, in order to reduce the repulsive effect of the anionic character of the cellulose fiber or particulate filter aids to the deposition of anionic charge modifier, sufficient cationic charge modifier may be deposited on at least one of said filter or particulate to reduce or reverse the latent charge in affected regions or sites thereon to permit deposition of a level of inorganic anionic charge modifier to provide enhanced electrokinetic charge potential and adequate wet strength. The process may be iterated as desired to accomplish a selected level of charge modification.

The filter media sheet is preferably formed by vacuum felting of the anionically disperse aqueous slurry comprising beaten cellulose fibers and fine particulate to provide a uniform, high porosity, and fine pore size structure with excellent filtration and flow characteristics. The filter media, comprising cellulose fiber as a matrix, and particulate filter aid, the surfaces of at least one of which have been modified with inorganic anionic colloidal silica, are free of extractables, such as formaldehyde or amines originating with organic resinous charge modifiers, and are free of discoloration, such that the sheets are usable under any sterilizing conditions and may be employed safely and effectively with potables or ingestables such as food or drugs; and exhibit a wet strength of at least 2.5 kg/in.

The filter sheets so prepared may be used in the treatment of fluids for the removal of submicronic impurities therein, alone or in conjunction with other filter media. In one such combination, the anionically charged medium of the present invention may be employed in concert, as in tandem, with a cationically charged medium, as disclosed in copending and commonly assigned application Ser. No. 027,568 of Hou, et al., now abandoned, for the efficient removal of differentially charged contaminants. A representative use, for removal of hazes and haze precursors in alcoholic and fruit beverages is described in copending and commonly assigned application Ser. No. 065,258 of Green, et al. filed Aug. 9, 1979, now abandoned, incorporated herein by reference.

The inorganic anionic colloidal silica is an aqueous dispersion of negatively charged colloidal particles, as disclosed in any one of U.S. Pat. Nos. 2,224,325; 2,285,477; 2,574,902; 2,577,485; 2,597,872; 2,515,960; 2,750,345; or 2,573,743; incorporated herein by reference, and available commercially for example as Ludox LS, MS and HS, all aqueous sols containing about 30 percent solids sold by E. I. duPont de Nemours and Co.; and Cab-O-Sil, a colloidal silica powder sold by Cabot Corporation of Boston, Mass.

While the principal requirement for this component of the filter system is that it functions as a charge modifier and dispersion agent, it should also be able to interact with the matrix to provide strong bonding as by cross-linking. It is surprising, in that the bonding of organic to inorganic materials is more difficult to achieve, to find that strong bonds are achieved with cellulose fiber upon curing with colloidal silica. However, the bonding once achieved is relatively more inert to its surrounding environment, and loss of the material by hydrolytic or solvolytic action, believed to be among the causes of impurities or extractables generated in other systems, is obviated. The maximization of wet strength, even at low levels of cationic modifier, is believed to be related to the essential structural identity of the inorganic cationic and anionic modifiers employed.

In preferred embodiments of the invention, relatively high loadings of fine particulates such as diatomaceous earth or perlite, to 50-70 percent of more by weight of the sheet, are employed. Without wishing to be bound by an essentially hypothetical elucidation, it is believed that surface modification of these materials with silica colloid, particularly at these high loadings, contributes to the integrity of the overall structure, and may be attributable to the formation of some siliceous, or inorganic interbondings, interengaging the relatively low level (10-20%) of cellulose fibers comprising the total sheet weight in such embodiments, with the particulates by way of the cross-linking action of the active hydroxyl sites provided by the colloidal silica.

BRIEF DESCRIPTION OF THE DRAWINGS

The present invention is further illustrated by the accompanying drawings, in which:

FIG. 1, is a graph of weight percent of anionic charge modifier vs. wet strength for the resulting anionically modified sheet, at varying levels of cationic charge modifier employed in the pretreatment of the filter elements.

FIG. 2, is a graph of normalized streaming potential vs. time, comparing equilibrium flush out curves for a prior art filter sheet, and a filter sheet manufactured in accordance with the invention.

DETAILED DESCRIPTION OF THE INVENTION

The filter media sheets of the invention are prepared from anionically modified filter elements, usually in the form of an anionically disperse aqueous slurry comprising cellulose fiber and optimized levels of fine particulate such as diatomaceous earth or perlite. The filter elements may be anionically modified in the slurry and the sheet prepared dynamically by vacuum felting, and drying, or the filter elements may be pretreated and formed into sheet media. A special feature of the invention is the provision of filter media sheet in which the level of particulate retained is enhanced as compared to sheet prepared conventionally.

The state of refinement of a wood pulp fiber is determined by means of a "freeness" test in which measurement as the flow rate through a forming pad of the fibers on a standard screen is determined, most commonly utilizing the "Canadian Standard Freeness Tester". In this method, the quantity which is measured is the volume of water (expressed in ml.) which overflows from a receiver containing an orifice outlet at the bottom. The Canadian Standard Freeness measurements are employed in the present specification. Coarse unbeaten wood pulp fibers produce high drainage rates into the receiver from the screen resulting in large overflow volumes, and hence record a high freeness. Typical wood pulps show Canadian Standard Freeness values ranging from +400 ml. to +800 ml. In paper or filter media manufacture, such pulps may be subject to mechanical refining processes such as beating which tends to cut and/or fibrillate the cellulose fibers. Such beaten fibers exhibit slower drainage rates, and, therefore, lower freeness.

In accordance with the present invention, such beaten pulp is preferably employed in the self-bonding matrix for the filter media. The Canadian Standard Freeness of the pulp system will vary with pulp selection, and may be reflective of varying states of subdivision or refinement, as where different pulps or differently beaten pulps are combined for sheet formation, but the beaten pulp will be employed to provide a composite or average value ordinarily ranging from 100 to 600 ml., with lower values e.g., 200-300 ml. or less being preferred for higher solids retention.

The wood pulp may comprise as little as 10 percent by weight with up to 20 to 30 percent, by weight of the total, being preferred to provide filter media sheet with structural characteristics suitable for industrial filtration applications.

Performance is enhanced by maximizing the amount of fine particulate in the filter media sheet. While as little as 10 percent of a fine particulate will result in noticeable improvement in filtration performance of either type of media, optimum performance is achieved by utilizing the maximum amount of fine particulate. For industrial filtration, structural characteristics suggest a practicable maximum of about 70 percent by weight. Of course, for less demanding applications, somewhat higher levels will be possible. Generally, levels of 50-70 percent by weight are employed.

There are various types of fine anionic particulates that are suitable for the intended purpose, including diatomaceous earth, perlite, talc, silica gel, activated carbon, molecular sieves, clay, etc. Functionally, the fine particulate should have a specific surface area in excess of one square meter/gram and/or particle diameters of less than 10 microns. In a broad sense, any fine particulate may be suitable (such as J. M. Filter Cel, Standard Syper Cel, Celite 512, Hydro Super Cel, Speed Plus and Speedflow; Dicalite 215 and Dicalite 416 and Dicalite 436) and may be evaluated by techniques well-known to the art. Siliceous materials are preferred, and from the standpoint of size, morphology, cost, fluid compatibility and general performance characteristics, the finer grades of diatomaceous earth/perlite for example, in proportion by weight of from about 80/20 to 20/80 give better filtration performance or better cost/performance characteristics than that achieved by the use of any single type by itself. Similarly, mixtures in all proportions of relatively coarse and fine particulates, e.g., 50/50 parts by weight of 10 and 5 micron diameter particulates may be used.

In paper production, where charge modifiers are sometimes used, the objective is reduction of charge to approximately the isoelectric point to maximize efficiency in interfelting of fiber. For filtration, maximum charge is desired to enhance removal of charged particles by electrokinetic mechanisms. In the present case the surface charge of at least one of the negatively charged filter elements, i.e., cellulose and particulate is first reduced to render the surface less electronegative and receptive to deposition of the desired amount of anionic charge modifier, whereupon the surface is rendered even more electronegative providing at least certain more highly electronegative regions or sites within the filter sheet.

In the first stage of the process, the particulate filter aid and beaten cellulose pulp is dispersed in an aqueous medium, and treated with an inorganic cationic charge modifier, preferably cationic silica colloid.

Suitable cationic colloidal silica materials include those of U.S. Pat. Nos. 3,007,878; 3,252,917; 3,620,978; 3,719,607; and 3,956,171 all incorporated by reference.

These are aqueous dispersions of negatively charged colloidal particles consisting of a dense silica core coated with a negatively charged polyvalent metal-oxygen compound, e.g., of the class consisting of metal oxides, metal hyxroxides and hydrated metal oxides of metals having a valence of 3 or 4, preferably aluminum and titanium. Most preferably the dispersion is acidic, and the coating is of polymeric alumina species. Typically, the mole ratio of aluminum to silica on the surface is about 1:1, and the dispersion (which has been commercially available as Ludox Positive Sol 130M, from E. I. duPont de Nemours & Co.) is stabilized with a counterion, as described in the aforesaid U.S. Pat. No. 3,007,878. The dispersion has been supplied at 30% solids stabilized with chloride ion (1.4%, as NaCl) for use in the pH range 3.5 to 5.5.

The colloidal particles exhibit a surface area of about 150–225 $m^2/g$ by nitrogen adsorption, a particle diameter of about 15–16 mu, and a molecular weight of about 5 to 18 million by light scattering.

In its preferred form, the characteristics of the silica aquasol are further modified to higher levels of polymeric alumina species calculated as alumina from 13 to 15% or more, in the stable range based upon the colloidal solids. The coating, or overcoating, may be achieved by simply treating with an appropriate aluminum compound, e.g., basic aluminum chloride, as described in U.S. Pat. No. 3,007,878, or another source of polybasic aluminum cations. The alumina in such systems exists as a surface coating and, to the extent it exceeds the available surface area, as free alumina in solution. The free alumina may, of course, also serve as a coating for virgin filter elements, e.g., particulate present and systems so prepared offer improved resistance to autoclaving and hot water flushing conditions together with added wet strength. When desired, the resulting colloidal dispersion may be, and customarily is treated to remove excessive electrolyte, as by dialysis, in order to achieve storage stability.

The amount of inorganic cationic colloidal silica employed in the initial treatment of the filter elements is in general an amount rendering the surfaces of the cellulose pulp and/or particulate receptive to the deposition of the inorganic anionic colloidal silica to a level providing enhanced electrokinetic capture potential for positively charged submicronic contaminants and adequate wet strength i.e., at least 2.5 kg/in. in the sheet. Preferably, an amount of inorganic cationic colloidal silica just sufficient to modify the surface charge of the filter elements electroneutral or slightly electropositive is employed. Usually a relatively small amount of inorganic cationic charge modifier in the range of 0.1 to 1.0 wt. percent by weight of the filter elements proves sufficient. This is somewhat surprising, considering the surface area involved, but may be explicable in the sense of providing a minimum number of receptive bonding sites for the anionic charge modifier. Of course, larger amounts of inorganic cationic modifier may be used but, given the objective of providing an anionically charged sheet, are contraindicated since this will necessitate employing correspondingly larger amounts of inorganic anionic modifier.

The inorganic cationic charge modifier is essentially fully sorbed onto the surfaces of at least one of the cellulose pulp and particulate filter aid within a very short period of time i.e., essentially within one minute, whereupon the second stage treatment may be commenced. It will of course be understood that the filter elements may be pretreated with inorganic cationic charge modifier, and then modified anionically in the sheet forming slurry.

In this stage, employing the inorganic anionic charge modifiers described above, the amount of charge modifier employed is preferably that sufficient to at least provide an anionically disperse system, i.e., a system in which no visible flocculation occurs at ambient conditions in the absence of applied hydrodynamic shear forces. The system therefore comprises essentially discrete fiber/particulate elements exhibiting a negative charge or zeta potential relatively uniformly or homogeneously distributed in and throughout the aqueous medium. The specific level will, of course, vary with the system and the modifier selected but will be readily determined by one skilled in the art.

The charge modification effected is demonstrable in measurements of surface zeta potential, and in improved filtration efficiency for positively charged particles in liquid systems.

The slurry of pulp and particulates is formed in any suitable manner. The sequence of adding these components to water to form the initial slurry appears to be relatively unimportant, except that, as aforesaid, the inorganic cationic charge modifier is essentially fully sorbed, deposited or coated onto the filter elements prior to addition of the inorganic anionic modifier. The consistency of the slurry will represent the highest possible for a practical suspension of the components, usually about 4 percent. The system is subjected to hydrodynamic shear forces as by a bladed mixer, and the charge modifier is then added to the slurry.

The shear level is not critical, i.e., any otherwise suitable shear rate or shear stress may be employed having regard for available equipment, preferred processing times etc. but is selected and employed simply to break up the flocs as required and maintain the system in a dispersed condition during treatment. Of course, upon the formation of an anionically disperse slurry, the system is free of floc formation even in the absence of applied shear.

After charge modification, the slurry is diluted with additional water to the proper consistency required for vaccum felting sheet formation, ordinarily 0.5 to 2½ percent, depending upon the type of equipment used to form the sheet, in a manner known to the artisan. The slurry is formed into a sheet and oven dried in standard manner. The performance of the sheet as related to the drying parameters and optimized conditions may reflect energy considerations or desired thermal history consistent with minimization of unnecessary exposure to elevated temperatures, especially as the decomposition or scorch point for the system is approached.

In accordance with a preferred embodiment of the invention, filter media sheets are formed from filter elements, i.e., particulate and a self-bonding matrix of beaten cellulose pulp, at least one of which is charge modified, the pulp being a system incorporating beaten pulp to provide a Canadian Standard Freeness of up to 600 ml., preferably less than 300 ml. e.g., 100–200 ml. the charge modifier consisting of inorganic anionic silica and being applied in a proportion to enhance electronegativity of the surface and secure a wet strength of at least 2.5 kg/in. Filter media sheets so prepared may be autoclaved, hot water flushed or otherwise treated at elevated temperature to sanitize or sterilize the structure.

Most preferably, both cationic and anionic charge modifiers comprise the same basic silica material which is believed to contribute to the maximization of performance characteristics, especially wet strength.

While the invention has been principally described by reference to filter media sheet, it will be understood that the principles set forth will have similar applicability to the construction of other fiber and fibre-particulate structures including depth filters in wound or compacted form.

Filter media sheets in accordance with the invention may be employed alone or in combination with other such media to treat fluids containing proteinaceous contaminants wherein the pH of the fluid is of sufficiently low value so that the proteinaceous contaminants are essentially cationic. Specifically, such filter media sheets are effective in the removal of submicron protein chill hazes which are formed in distilled spirits, beers, fruit juices and other such low pH generally acidic fluids.

The present invention is representatively illustrated in the following examples, in which certain tests are performed as described hereinafter.

Oil Flow Test

As a measure of the porosity of the filter media sheets, 100 ssu oil is pumped through the sample sheet until a differential pressure drop of 5 psid is attained, at which point the flow rate (ml./min.) is recorded.

Wet Strength

Wet strength is determined via a tensile test on a 2" wide test specimen which has been presoaked in distilled water for 5 minutes, employing UTM Chatillon Model UT-SM.

Normalized Streaming Potential

The measurement of streaming potential is a conventional means of determining zeta potential i.e., the electric potential excess of the surface, and the surrounding fluid to the hydrodynamic shear plane, over the bulk potential of the fluid. In the present test, streaming potential values are determined, and normalized for differing pressure drop in the media being tested, expressing the results in units of millivolts per foot of water. The filter media is evaluated by flushing out the filter media with water until the measured streaming potential achieves a relatively stable maximum value. At this point, the filter media has ceased to contribute any significant ionic species to the water, i.e., the inlet resistivity equals the outlet resistivity.

The filter media test cell is based on the design of Oulman, et al. JAWWA 56:915 (1964). It is constructed from Lucite having an effective area of 3.14 square inches (2" diameter) and is equipped with platinum black electrodes. Water and mercury manometers are used to measure the pressure drop across the media being evaluated. Streaming potential values (by convention, of opposite sign to the zeta potential and the surface charge) are measured with a high impedance volt meter. The influent and effluent resistance are monitored with conductivity flow cells (cell constant=0.02/cm) using a resistance bridge.

Upon the attainment of equilibrium streaming potential (i.e., after flush out) contaminant challenge tests may be performed in the same system. The tests above are described in more detail in a paper presented at the 71st Annual AICHE meeting (1978): "Measuring the Electrokinetic Properties of Charged Filter Media", Knight, et al.

In the following examples which further illustrate this invention; proportions are by weight, based upon total pulp and particulate, excluding charge modifier.

EXAMPLE I

In each of the following runs, cellulose pulp having an average Canadian Standard Freeness of 130 ml. (in an amount to constitute 31% by weight) was dispersed in water to a consistency of about 4%, 426 perlite (diatomaceous earth supplied by Grefco, having a mean particle size of 4.2 microns) was added (in an amount to constitute 69% by weight) while maintaining the consistency with the addition of water, and the inorganic anionic silica colloid charge modifier added, while the system was maintained under agitation (hydrodynamic shear applied by action of a Hei-Dolph stirrer by Polyscience Inc., having 4 propeller blades, rotating at about 700 ppm on setting 2). The slurry was subsequently diluted to 0.5 percent consistency and vacuum felted into a sheet ranging from about 0.160 to 0.200 inch thickness (depending upon retention) in a nine inch by twelve inch hand sheet apparatus utilizing a 100 mesh screen. The sheet was subsequently removed, dried in a static oven at 350° F. until constant weight was achieved, and the final weight recorded.

To demonstrate the effect of pretreating the filter elements with inorganic cationic silica colloid, in runs 5-11 the slurry was first dispersed with the cationic silica colloid, and the system agitated for 15 minutes to effect deposition of the modifier on surfaces of the particulate/fiber components, whereafter anionic silica colloid was dispersed in the system, deposited on the filter elements and the sheet forming completed as above.

The vacuum filtered sheets were compared in respect of flow properties and wet strength as follows:

TABLE I

| Sheet No. | Pulp Freeness (CSF) | Anionic Silica Colloid, Wt. % | Cationic Silica Colloid, Wt. % | Oil Flow (ml/min.) | Wet Strength (kg/in.) |
|---|---|---|---|---|---|
| Control | 130 | 0 | 0 | | 1.20 |
| 1. | 130 | 3 | 0 | 21.0 | 2.15 |
| 2. | 130 | 5 | 0 | 20.0 | 2.30 |
| 3. | 130 | 6 | 0 | 18.0 | 2.60 |
| 4. | 130 | 10 | 0 | 15.0 | 2.75 |
| 5. | 130 | 5 | 0.1 | 20.0 | 3.27 |
| 6. | 130 | 5 | 0.2 | 18.0 | 3.60 |
| 7. | 130 | 6 | 0.2 | 18.0 | 3.65 |
| 8. | 130 | 5 | 0.4 | 18.0 | 4.00 |
| 9. | 130 | 3 | 0.1 | — | 2.6 |
| 10. | 130 | 6 | 0.1 | — | 3.3 |
| 11. | 130 | 3 | 0.2 | — | 2.7 |

As will be seen from the foregoing results, graphically represented in accompanying FIG. 1, pretreatment with the inorganic cationic colloidal silica prior to treatment with the inorganic anionic colloidal silica enhanced the wet strength of the sheet considerably, while maintaining comparable flow rates.

EXAMPLE II

The procedure of Example I was repeated except that the pulp freeness was modified under constant conditions, as follows:

TABLE II

| Sheet No. | Pulp Freeness (CSF) | Anionic Silica Colloid, Wt. % | Cationic Silica Colloid, Wt. % | Oil Flow (ml/min.) | Wet Strength (kg/in.) |
|---|---|---|---|---|---|
| 1. | 241 | 6 | 0.1 | 42.5 | 2.35 |
| 2. | 130 | 6 | 0.1 | 18.0 | 2.60 |
| 3. | 62 | 6 | 0.1 | 12.5 | 3.25 |
| 4. | 22 | 6 | 0.1 | 7.0 | 3.45 |

The lower freeness values (more highly beaten pulp) were preferred for wet strength, but affected flow. From the results of this and the prior example, it can be seen that lower levels of anionic silica colloid, e.g., 5% with higher levels of cationic silica colloid, e.g., 0.3% are preferred for the best balance of wet strength and flow.

EXAMPLE III

In this Example, the performance of a prior art cationic silica colloid (Wesol PA) charge modified filter media sheet (see copending application Ser. No. 027,568) was compared to filter media sheet prepared from filter elements pretreated with cationic silica colloid, and then charge modified with anionic silica colloid in accordance with the invention.

A. Filter media sheets were prepared containing 30% by weight of a cellulose pulp system (C.S.F. about 130) and 70% by weight of particulate (The filter sheet of the invention employed a mixture of perlites, and whereas that of the prior art utilized a 50/50 admixture of diatomaceous earth and perlite) and were each formed in identical manner by preparing an ionically disperse aqueous slurry charge modifying, vacuum felting and oven drying, except that in the case of the invention, the filter elements were first dispersed with cationic silica colloid (Wesol PA, 0.1%) for a period of 15 minutes sufficient to permit essentially complete deposition, and thereafter the filter elements were charge modified with anionic silica colloid (Ludox HS-30, 5%) whereas in accordance with the prior art the filter elements after deposition of cationic modifier (Wesol PA, 6%) thereon.

Employing test conditions detailed above, normalized streaming potential values were determined over time, and equilibrium flush out curves plotted for the respective filter media, compared in FIG. 2. As will be seen, the prior art media exhibits an increasingly negative normalized streaming potential which stabilized at a high equilibrium valve indicative of a high positive surface charge. The media prepared in accordance with the invention exhibits a positive normalized, equilibrium streaming potential which corresponds to its anionic nature.

B. The anionic filter media sheet of the invention was subjected to contaminant challenge in a manner illustrative of the removal of submicronic proteinaceous substance. Blended whiskey containing an abundant well dispersed very fine haze (8 NTU, initial pH, 4.1 ambient temperature) was passed through the anionic filter media. Effluent turbidity values were reduced to about 1 NTU, evidencing the removal of cationically charged haze formers. Similar results were achieved with unstable rum, and other liquids containing proteinaceous impurities of cationic nature below the isoelectric point.

While the invention has been described hereinabove with reference to the use of a single filter sheet media, it will be understood that multiple sheets may be used to provide further depth, or the anionic filter sheet may be used in coordination, as in tandem with a cationic filter sheet to remove differentially charged impurities. In a preferred embodiment this invention constitutes an improvement to the process of stabilizing unstable beverages against haze development disclosed and claimed in copending and commonly assigned application Ser. No. 065,258 of Green, et al., filed Aug. 9, 1979, now abandoned, in which the beverage is conducted through a first filter medium, the surfaces of which are modified with a polyamido polyamine epichlorhydrin cationic resin, forming haze in the beverage, the improvement comprising thereafter conducting the beverage through the anionic filter sheet of the invention to remove haze or haze formers. Hazes formed in such beverages by the conventional chilling process may of course also be removed in this manner.

What is claimed is:

1. A process for the removal of haze or haze formers which are cationic submicronic proteinaceous contaminants from a beverage, comprising conducting a beverage containing such contaminants through a filter media having an anionic electrokinetic capture potential for such contaminants, the filter media being prepared by:
   a. treating filter elements selected from the group consisting of cellulose pulp and particulate filter aids with an amount of inorganic cationic colloidal silica surface charge modifier to render the surface of the filter elements receptive to the subsequent deposition of an inorganic anionic colloidal silica charge modifier, thereafter,
   b. charge modifying the treated filter elements with an inorganic anionic colloidal silica charge modifier, and
   c. forming the filter elements into a sheet having a negative zeta potential and a wet strength of at least 2.5 kg/in.

2. The process of claim 1, wherein the amount of cationic charge modifier is at least sufficient to render the surface charge of the filter elements electroneutral.

3. The process of claim 1, wherein the cationic charge modifier is employed in an amount of from about 0.1 to about 1.0 weight percent of the filter elements.

4. The process of claim 1 or 3, wherein the anionic charge modifier is employed in an amount of from about 1 to 10% by weight of the filter elements.

5. The process of claim 1, wherein the particulate filter aid is siliceous.

6. The process of claim 1, wherein the haze or haze formers are produced by chilling the beverage.

7. The process of claim 1, wherein the haze or haze formers are produced by conducting the fluid through a cationic filter media.

8. The process of claim 7, wherein the cationic filter media has the surface thereof modified with a polyamido polyamine epichlorhydrin cationic resin.

* * * * *